US00RE38729E

(19) United States
(12) Reissued Patent
Liu

(10) Patent Number: US RE38,729 E
(45) Date of Reissued Patent: Apr. 26, 2005

(54) COMBINATION OF AN ELECTRIC-POWERED TOOL AND AN ILLUMINATING DEVICE RECEIVED IN THE TOOL

(75) Inventor: Kuo-Chen Liu, Taichung Hsien (TW)

(73) Assignee: ICC Innovative Concepts Corporation, Torrington, CT (US)

(21) Appl. No.: 10/113,953

(22) Filed: Apr. 1, 2002

Related U.S. Patent Documents

Reissue of:
(64) Patent No.: 6,168,287
Issued: Jan. 2, 2001
Appl. No.: 09/264,682
Filed: Mar. 9, 1999

(51) Int. Cl.[7] ..... B25B 23/18
(52) U.S. Cl. ..... 362/119; 362/190; 362/253; 362/394
(58) Field of Search ..... 362/89, 109, 119, 362/157, 253, 394, 191, 197, 198, 199, 120, 269, 287, 395; 408/16, 241 R

(56) References Cited

U.S. PATENT DOCUMENTS

| | | | | |
|---|---|---|---|---|
| D156,319 | S | | 12/1949 | Bushnell |
| D159,044 | S | | 6/1950 | Bushnell |
| D233,130 | S | | 10/1974 | Slany |
| D233,131 | S | | 10/1974 | Slany |
| D269,588 | S | | 7/1983 | Ludwig |
| D288,770 | S | | 3/1987 | Doman |
| D289,136 | S | | 4/1987 | Doman |
| D301,299 | S | | 5/1989 | Chapin |
| D315,855 | S | | 4/1991 | Fushiya et al. |
| 5,033,552 | A | | 7/1991 | Hu |
| D320,917 | S | | 10/1991 | Fushiya et al. |
| D322,205 | S | | 12/1991 | Liu |
| D322,384 | S | | 12/1991 | Wan |
| D329,580 | S | | 9/1992 | Sasaki et al. |
| D335,250 | S | | 5/1993 | Rosier |
| D339,046 | S | | 9/1993 | Fushiya et al. |
| D340,396 | S | | 10/1993 | Ichikawa |
| 5,401,928 | A | * | 3/1995 | Kelley ..... 200/510 |
| 5,427,002 | A | * | 6/1995 | Edman ..... 81/57 |
| 5,445,479 | A | * | 8/1995 | Hillinger ..... 408/16 |
| D388,301 | S | | 12/1997 | Steel |
| 5,797,670 | A | * | 8/1998 | Snoke et al. ..... 362/119 |
| D410,830 | S | | 6/1999 | Pusateri et al. |
| 5,954,458 | A | * | 9/1999 | Lee ..... 408/16 |
| 5,982,059 | A | * | 11/1999 | Anderson ..... 310/50 |
| D424,902 | S | | 5/2000 | Gildersleeve et al. |
| D436,819 | S | | 1/2001 | Liu |

* cited by examiner

*Primary Examiner*—John Anthony Ward
(74) *Attorney, Agent, or Firm*—Kirkpatrick & Lockhart LLP; Anthony H. Handal

(57) ABSTRACT

An electric-powered tool includes a handle for receiving batteries herein and a barrel with a driving shaft rotatably connected to the distal end of the barrel portion. The driving shaft is controlled by a switch which is electrically connected between the batteries and the driving shaft. An illuminating device includes two bulbs attached beside the driving shaft and the bulbs are electrically connected to the switch so that when turning on the switch, the bulbs light to illuminate the object to be worked with.

19 Claims, 4 Drawing Sheets

AMENDED

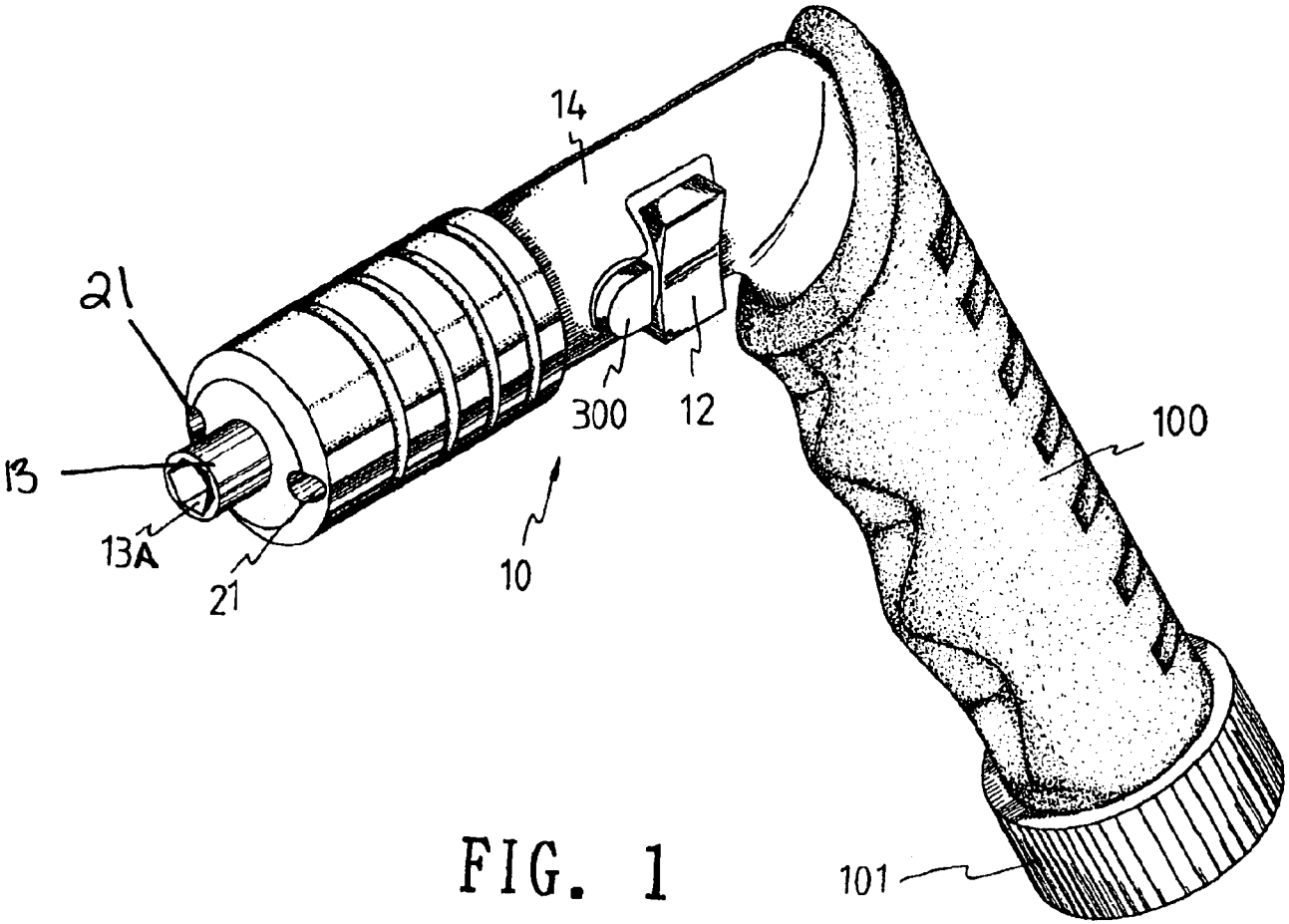
FIG. 1
AMENDED

COMBINATION OF AN ELECTRIC-POWERED TOOL AND AN ILLUMINATING DEVICE RECEIVED IN THE TOOL

Matter enclosed in heavy brackets [ ] appears in the original patent but forms no part of this reissue specification; matter printed in italics indicates the additions made by reissue.

FIELD OF THE INVENTION

The present invention relates to an electric-powered tool and an illuminating device received in the tool, and more particularly, in an electric-powered tool having two illuminating members connected beside the driving shaft and the illuminating members are controlled by a switch attached to the body of the tool.

BACKGROUND OF THE INVENTION

Many conventional electric-powered tools are designed to improve their functions or features to perform quickly or powerfully. Once of the advantages of the electric-powered tool is that the electric-power [makes] *enables* the work to be easily completed so that any user can use the tool without troubles. However, although most of the electric powered tools have a great feature to powerfully drill a hole or hammer a nail, they do not *come* equipped with an illuminating device to provide sufficient light on the object. In other words, if the user wants to work in a dark area, he/she has to carry [with] a flashlight and uses one had to hold the tool and the other hand to hold the flashlight. This more or less limits the user to handle the tool and could reduce the concentration of his/her mind on the object.

The present invention intends to provide an electric-powered tool having an illuminating device which can be turned on together with the driving shaft so that when using the tool, the user simply turns on the switch of the tool, the object is illuminated so that it is convenience for the user to deal with the object by the electric-powered tool It is believed that the combination of the electric-powered tool and the illuminating device may resolve the shortcomings of the conventional electric-powered tool.

SUMMARY OF THE INVENTION

In accordance with one aspect of the present invention, there is provided an combination of an electric-powered tool and an illuminating device. The electric-powered tool comprises a handle for receiving batteries therein and a barrel portion extending laterally from the handle. A driving shaft rotatably extends from the distal end of the barrel portion and controlled by a switch connected to the barrel portion. The switch is electrically connected to the driving shaft and the batteries. The illuminating device comprises two bulbs attached beside the driving shaft and are electrically connected to the switch.

It is an object of the present invention to provide an electric-powered tool having an illuminating device which illuminates the object when turning on the electric-powered tool.

These and further objects, features and advantages of the present invention will become more obvious from the following description when taken in connection with the accompanying drawings which show, for purposes of illustration only, several embodiments, in accordance with the present invention.

BRIEF DESCRIPTION OF THE DRAWINGS

FIG. 1 is a perspective view of the electric-powered tool with the illuminating device in accordance with the present invention;

DETAILED DESCRIPTION OF THE PREFERRED EMBODIMENTS

Figure 2:
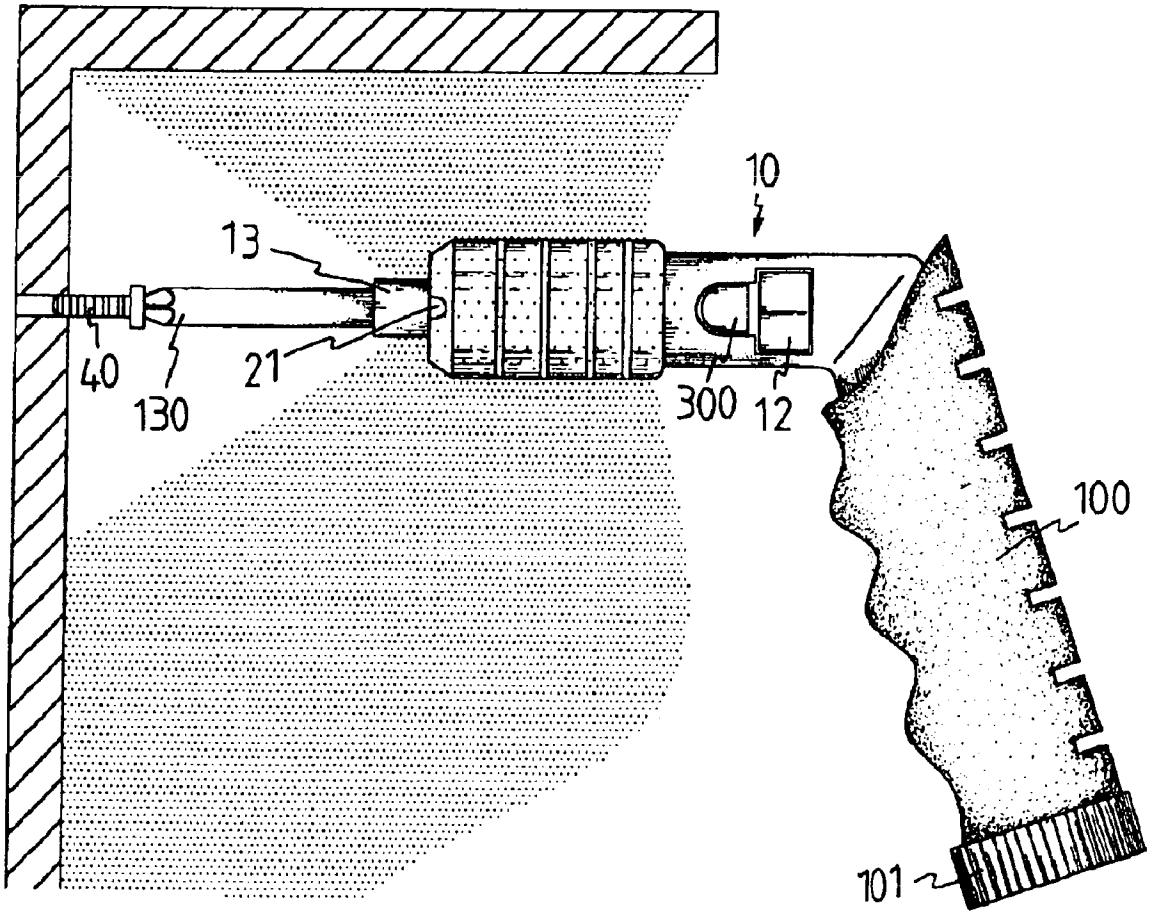
FIG. 2 is an illustrative view to show the illuminating device illuminating the object when the tool of the present invention.
Figure 3:
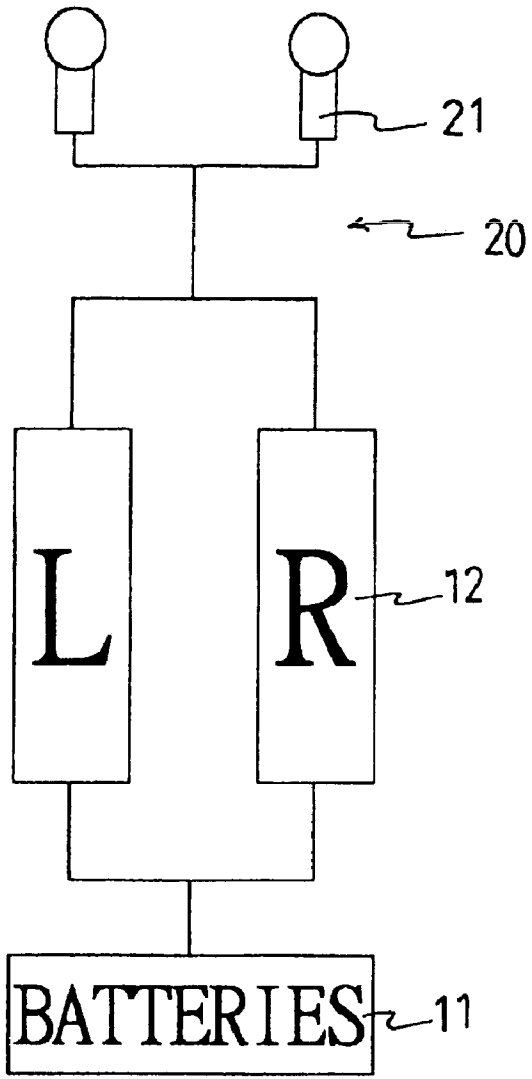
FIG. 3 is an illustrative diagram to show the arrangement of the batteries, the switch and the bulbs of the illuminating device.

Referring to FIGS. 1 and 3, the electric-powered tool (10) in accordance with the present invention comprises a handle (100) and a barrel portion (14) extending laterally from the handle (100) in which batteries (11) [is] *are* received and a cap (101) is connected to the lower[ed] *end* of the handle (100) so as to prevent the batteries (11) from dropping from the handle (100). A driving shaft (13) rotatably extends from the distal end of the barrel portion (14) and a switch (12) is connected to the barrel portion (14). The switch (12) is essentially connected to the driving shaft (13) and the batteries (11) so that the driving shaft (13) *having a distal, bit-receiving socket 13A, shown as a hex socket,* is actuated to rotate by operating the switch (12). The switch (20) includes an L portion to let the driving shaft (13) rotate counter clockwise and an R portion to let the driving shaft (13) rotate clockwise.

The illuminating device (20) comprises two bulbs *in recesses* (21) attached beside the driving shaft (13) and electrically connected to the switch (12) so that when turning on the switch (12) the bulbs (21) illuminate the object such as a belt (40) which can be rotated by a screwdriver bit (130) engaged with the driving shaft (13).

Figure 4:
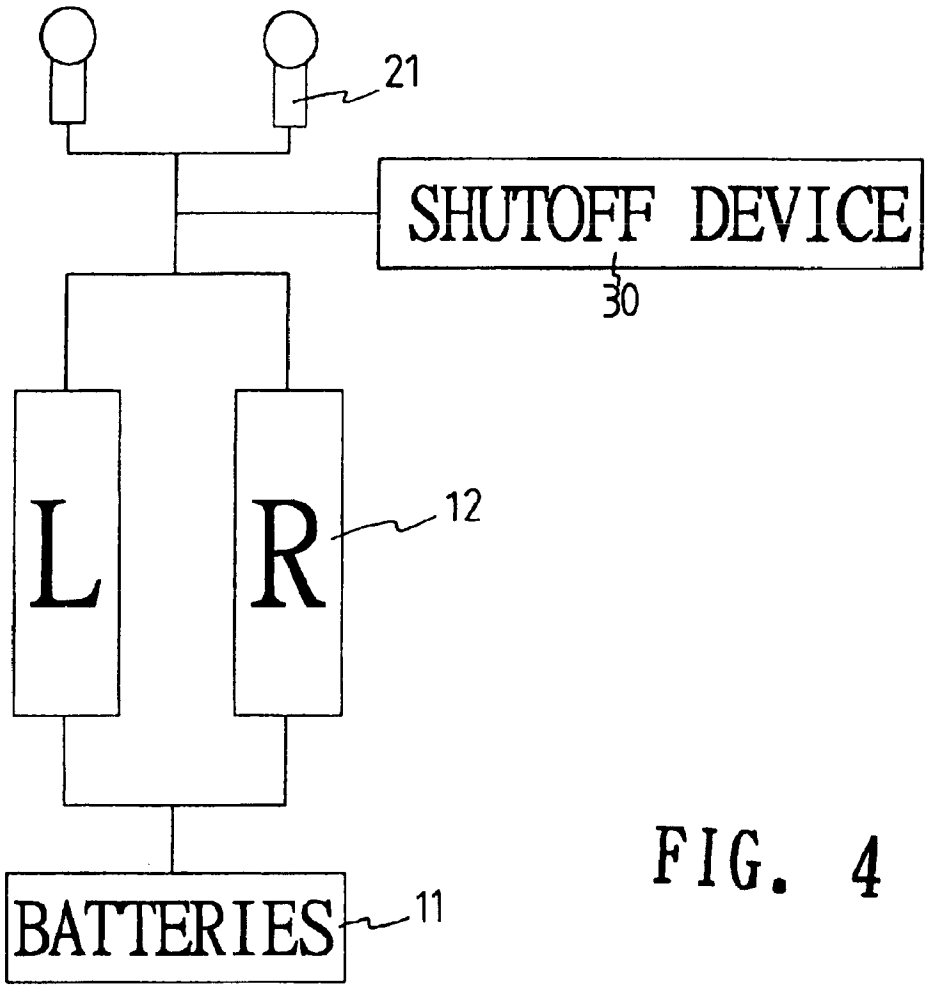
FIG. 4 is an illustrative diagram to show another embodiment of the arrangement of the batteries, the switch, the bulbs and a shutoff device of the illuminating device.

Referring to FIG. 4, a shutoff device (30) is connected between the switch (12) and the bulbs (21), and the shutoff device (30) is controlled by a button (300) attached to the barrel portion (14) *beside switch (12)*. Therefore, the shutoff device (30) can be turned on independently from the switch (12) so that the bulbs *in recesses* (21) will not be turned on while the driving shaft (13) is rotated.

The tool in accordance with the present invention provides a convenient advantage for the users to work in a dark area and only one hand can handle the tool (10) and the illuminating device (20).

While we have been shown and described various embodiments in accordance with the present invention, it should be clear to those skilled in the art that further embodiments may be made without departing from the scope and spirit of the present invention.

What is claimed is:

1. A combination of an electric-powered tool (10) and an illuminating device (20), said electric-powered tool (10) comprising a handle (100) and a barrel portion (14) extending laterally from said handle (100) in which at least one battery (11) is received, a driving shaft (13) rotatably extending from the distal end of said barrel portion (14), a switch (12) connected to said barrel portion (14) and electrically connected to said driving shaft (13) and said at least one battery (11) so that said driving shaft (13) is actuated to rotate by operating said switch (12);

said illuminating device (20) comprising two bulbs (21) attached beside said driving shaft (13) and electrically connected to said switch (12), and a shutoff device (30) connected between said switch (12) and said bulbs (21) and controlled by a button (300)

attached to said barrel portion (14), said button (300) located beside said switch (12).

*2. An illuminated electric-powered tool having an illuminating device attached to the electric-powered tool, the electric-powered tool being capable of being held in and operated by one hand and comprising:*

*a) a tool body having:*

*i) a handle; and*

*ii) a barrel portion extending laterally from the handle and having a distal end with respect to the handle;*

*b) at least one battery accommodated in the handle;*

*c) a rotatable driving shaft extending from the distal end of the tool body barrel portion;*

*d) a switch attached to the tool body and electrically connected to the driving shaft and the battery or batteries to actuate rotation of the driving shaft; and*

*e) an illuminating device attached to the barrel portion alongside the driving shaft and electrically connected to the switch;*

*f) a shutoff device connected between the switch and the illuminating device; and*

*g) a button to control the shutoff device, the button being located beside the switch;* wherein the illuminating device can be controlled by operation of the button by the user's one hand.

*3. An electric-powered tool according to claim 2 wherein the illuminating device is received in the barrel portion of the tool body, optionally in a recess in the barrel portion.*

*4. An electric-powered tool according to claim 2 wherein the illuminating device comprises two bulbs received in recesses alongside the driving shaft.*

*5. An electric-powered tool according to claim 2 wherein the switch has clockwise and counterclockwise switch settings.*

*6. An electric-powered tool according to claim 2 wherein the illuminating device has a fixed position and alignment to illuminate the work object.*

*7. An electric-powered tool according to claim 2 wherein, the shutoff device can be operated independently of the switch so that the illuminating device is not on when the drive shaft is rotated.*

*8. An electric-powered tool according to claim 2 wherein the driving shaft has a distal bit-receiving socket, optionally a hex socket, and the illuminating device is small in relation to the socket.*

*9. An electric-powered tool according to claim 2 wherein the illuminating device is adjacent the bit-receiving socket.*

*10. An electric-powered tool according to claim 2 wherein the illuminating device is received in at least one recess in the barrel portion of the tool body and wherein the illuminating device has a fixed position and alignment to illuminate the work object.*

*11. An electric-powered tool according to claim 10 wherein the driving shaft has a distal bit-receiving socket, optionally a hex socket, the illuminating device is small in relation to the socket and the illuminating device is adjacent the bit-receiving socket.*

*12. An illuminated electric-powered tool having an illuminating device attached to the electric-powered tool, the electric-powered tool being capable of being held in and operated by one hand of a user and comprising:*

*a) a tool body having;*

*i) an elongated handle; and*

*ii) a barrel portion joining and extending laterally from an end of the handle to have a distal end with respect to the handle;*

*b) at least one battery accommodated in the handle;*

*c) a rotatable driving shaft extending from the distal end of the tool body barrel portion;*

*d) a switch attached to the tool body and electrically connected to the driving shaft and to the battery or batteries to actuate rotation of the driving shaft;*

*e) a recess in the barrel portion alongside the driving shaft; and*

*f) an illuminating device received in the recess and connectable to the battery or batteries;*

*wherein the illuminating device is operable by said one hand of the user to illuminate a work object.*

*13. An electric-powered tool according to claim 12 wherein the illuminating device has a fixed position and alignment to illuminate the work object.*

*14. An electric-powered tool according to claim 12 wherein the driving shaft has a distal bit-receiving socket, optionally a hex socket, and the illuminating device is small in relation to the socket.*

*15. An electric-powered tool according to claim 14 wherein the illuminating device is adjacent the bit-receiving socket.*

*16. An electric-powered tool according to claim 12 wherein the illuminating device comprises two bulbs received in respective recesses alongside the driving shaft.*

*17. An electric-powered tool according to claim 12 wherein the switch has clockwise and counterclockwise switch settings.*

*18. An electric-powered tool according to claim 12 wherein the switch has*

*f) a shutoff device connected between the switch and the illuminating device; and*

*g) a manual control member, optionally a button to control the shutoff device, the manual control member being located beside the switch;*

*wherein the illuminating device can be controlled by operation of the button by the user's one hand.*

*19. An electric-powered tool according to claim 12 wherein the shutoff device can be operated independently of the switch so that the illuminating device is not on when the drive shaft is rotated.*

* * * * *